April 21, 1953
F. H. HOY
2,635,799
MEAT MOLD STUFFING DEVICE
Filed Dec. 30, 1950
2 SHEETS—SHEET 1
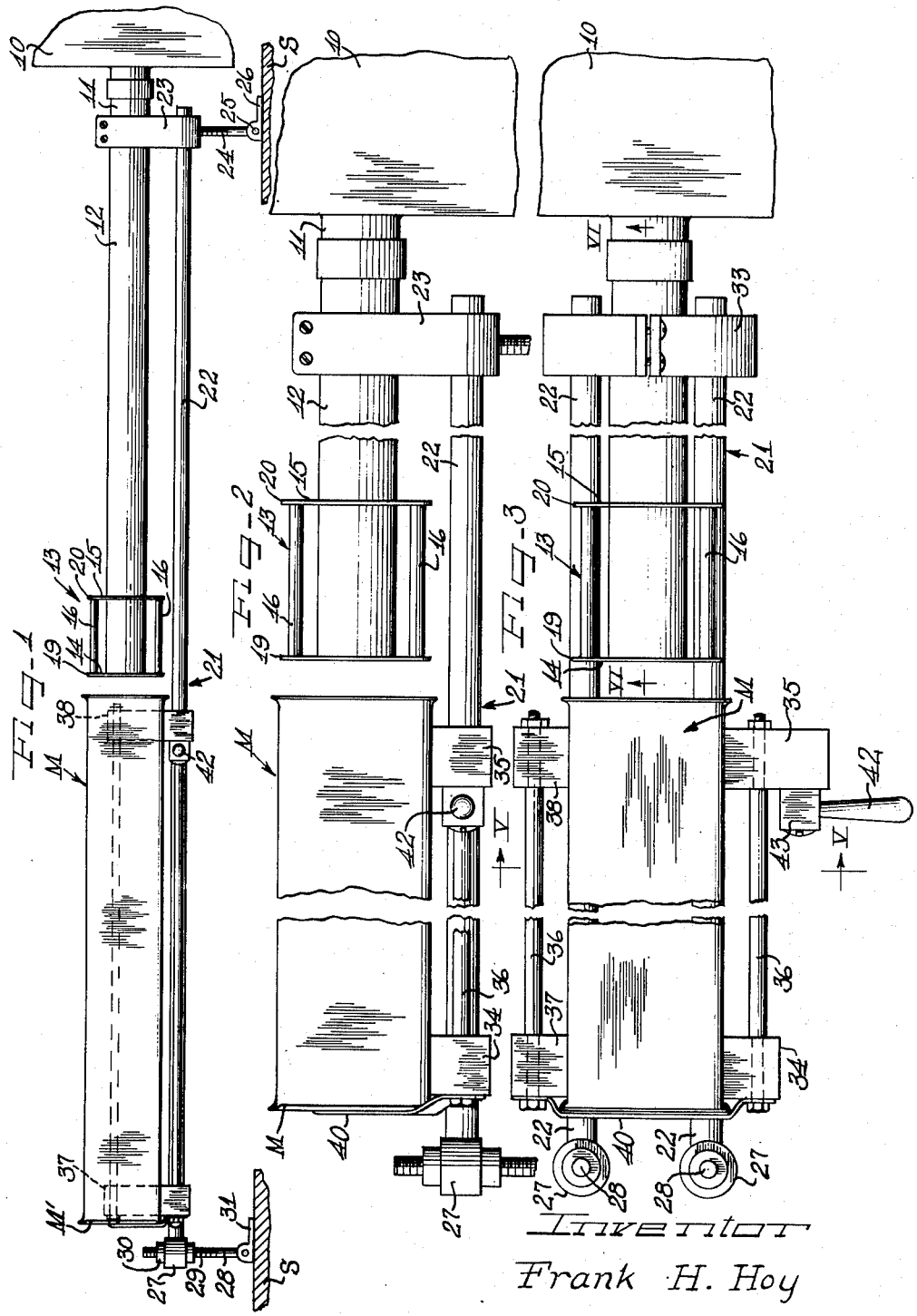
Inventor
Frank H. Hoy April 21, 1953  F. H. HOY  2,635,799
MEAT MOLD STUFFING DEVICE
Filed Dec. 30, 1950  2 SHEETS—SHEET 2
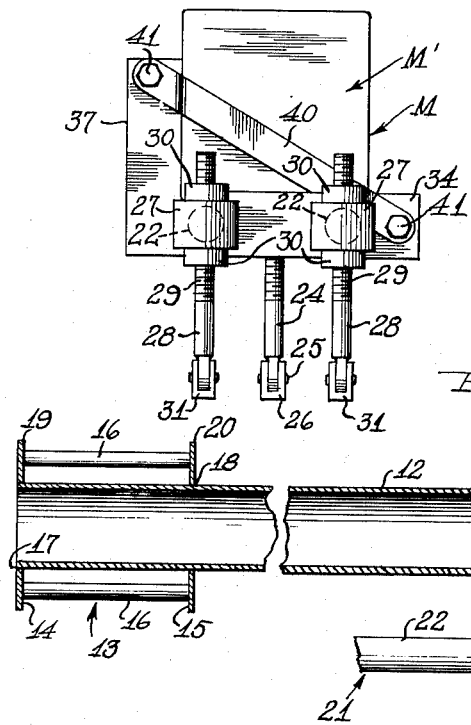
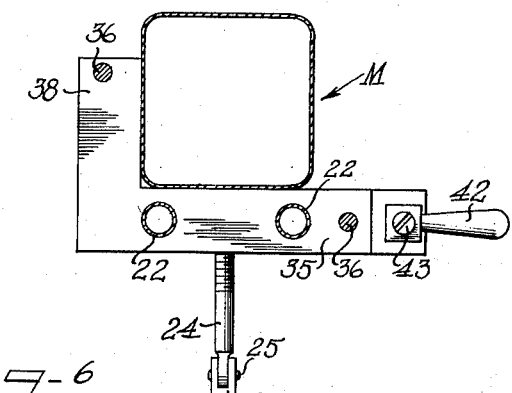
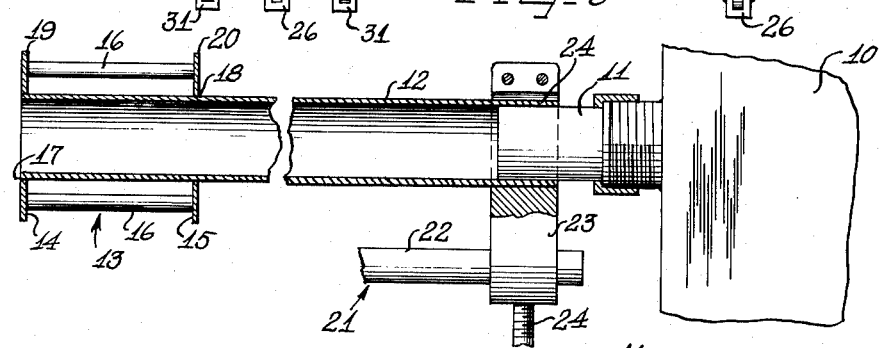
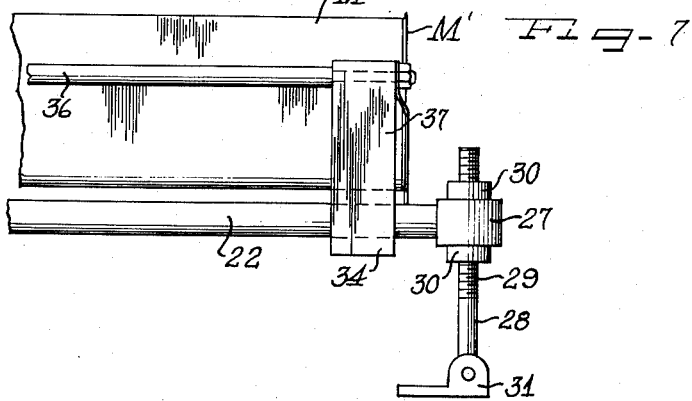
Inventor
Frank H. Hoy Patented Apr. 21, 1953

2,635,799

UNITED STATES PATENT OFFICE 2,635,799

MEAT MOLD STUFFING DEVICE

Frank H. Hoy, Milwaukee, Wis.

Application December 30, 1950, Serial No. 203,729

4 Claims. (Cl. 226—24)

This invention relates to a mold stuffing apparatus and more particularly to a meat mold stuffing device such as is used in the manufacture of molded loaves of meat and other edible products.

An object of this invention is to provide a stuffing device which is very simple in construction and which permits of the stuffing of the meat directly into the mold for forming the loaf.

Another object of the invention relates to the provision of a meat stuffing device which permits of a mold being manually moved into telescoped relation with a stuffing horn and which also permits of the operator manually controlling the rate at which the mold is stuffed so that it will be uniformly charged.

Yet a further object of the invention relates to the provision of a mold stuffing device which embodies a minimum of parts and which may be readily disassembled for cleaning consistent with good sanitation practices.

In accordance with the general features of this invention there is provided in a stuffing device for an elongated tubular mold, having a closed end and an open end through which the mold is charged with material, a frame on which a mold supporting carriage is slidably mounted, a stuffing horn including a tube supported with a discharge end over the frame opposite the open end of the mold and having at least its discharge end formed with an external surface of a cross-sectional contour corresponding generally with that of the inside of the mold so as to fit closely the inside surface of the mold when the carriage is slid along the frame toward the stuffing horn, and means for moving the carriage and horn into and out of telescoping relationship during the charging of the mold with material from the horn.

Another feature relates to providing the frame of the aforesaid stuffing device with adjustable legs each having a leveling device on its free extremity for adjustably engaging a surface to support the mold in leveled horizontal alignment with the horn.

Yet another feature of the invention relates to so locating the manual means for moving the carriage and mold that it can be employed by the operator to resist the pressure of the material as it is discharged from the horn into the mold between the closed mold end and the stuffing horn, whereby the mold can be tightly and uniformly charged with material.

Other objects and features of the invention will more fully appear from the following detailed description taken in connection with the accompanying drawings which illustrate a single embodiment thereof, and in which:

Figure 1 is a side view of my novel stuffing device showing it associated with the stuffing horn projecting from a stuffing head which is fragmentarily illustrated;

Figure 2 is an enlarged view similar to Figure 1 but partly broken away in order to permit of the enlargement;

Figure 3 is a fragmentary plan view of the structure shown in Figure 2;

Figure 4 is an end view of the structure shown in Figure 3 taken from the left hand end of the figure;

Figure 5 is a cross-sectional view taken on the line V—V of Figure 3 looking in the direction indicated by the arrows;

Figure 6 is a fragmentary sectional view partly broken away taken on the line VI—VI of Figure 3 and drawn on an enlarged scale; and Figure 7 is a fragmentary side view of the left hand end of the device shown in Figure 2 and taken from the side opposite that shown in Figure 2.

As shown on the drawings:

The reference character 10 designates generally a conventional stuffing head from which material is extruded in the usual way, as by means of a screw (not shown) through a discharge tube 11 which tightly telescopes and is secured to the elongated tubular horn 12 so as in reality to compose part of the horn.

The discharge end of the stuffing horn 12 has a head assembly designated generally by the reference character 13 which includes on the outermost end of the tube an apertured plate 14 tightly fitted on and welded to the outer surface of the tube. Spaced along the tube from plate 14 is a similar apertured plate 15 fastened to plate 14 by means of transverse rods 16. This entire device 13 may be suitably secured by means of welding, brazing, or the like, to the external surface of the horn 12. The peripheral edges 19—20 of the plates 14—15 are generally of a rectangular configuration and correspond to the cross-sectional contour of the inside of the meat mold M shown in section in Figure 5. In other words, these plates 14 and 15 are adapted to fit snugly the inside of the mold as the mold is telescoped over the head 13 on the horn 12.

The mold M is of an elongated tubular form generally of rectangular cross-section and has one end provided with a detachable end cap M'. The other or right end in Figures 1, 2 and 3 is formed open to receive the stuffing horn head 13. The mold M may be made of any suitable sheet material which, for sanitary reasons, I find it desirable to form from stainless steel sheet or the like.

The mold M is adapted to be detachably supported on a carriage designated generally by the reference character 21 and which includes a pair of spaced parallel longitudinally extending guide rods 22—22. At the right hand end (Figures 1, 2 and 3) the rods are anchored in a bearing or supporting member 23 which, as shown at 24 in Figure 6, is clamped about the horn 12 so as to be rigidly attached to the horn. The member 23 is in turn supported by a leg 24 adjustably threaded into the member 23. This leg 24 has pivotally secured at 25 the bifurcated end of a leveling device 26 which is adapted to bear adjustably on a supporting surface S for leveling the device on the surface.

The other extremities of the rods 22—22, as best shown in Figures 4 and 7, each extend into a block 27 and is held in place by the threaded upper end 29 of a leg 28. In other words, the threaded end 29 extends through an aperture in the end of the rod and is adjustably secured in position by threaded nut-like elements 30—30. Each of the legs 28 has pivotally secured to its lower end a leveling device 31 which is identical to the leveling device 26.

From the foregoing it is clear that the three legs 24 and 28—28 may be threadingly adjusted in their respective blocks or members 23 and 27—27 for bringing the carriage generally into parallel alignment with the supporting surface S and the leveling device 26 and 31 may be adjusted to variations in the contour of the surface on which the carriage is supported. This arrangement is such that the mold M can be brought into proper axial alignment with the head 13 so that the same can telescope the mold M as the mold is slid over the horn 12.

In addition, the guide rods 22—22 have slidably mounted on them a pair of spaced transverse supporting elements 34—35 on which the mold M is supported. The elements 34—35 are held together in fixed spaced relation by spaced rods 36—36 disposed parallel to the guide rods 22. The supporting elements 34—35 each have upwardly extending vertical legs 37—38 (Figures 1, 2 and 7) against which a side of the mold pan is adapted to rest, as shown in Figures 4 and 5. In other words each of the members 34 and 35 is of an L-shaped construction.

As best shown in Figures 5 and 7, one of the rods 36 connects the horizontal portion of these L-shaped members and the other rod 36 connects the vertical legs 37—38 of the supporting members 34 and 35.

The rearmost member 34 has its two leg portions connected by a strap 40, the ends of which are fastened as by means of nuts 41—41 to the ends of the rods 36—36 (Figures 4 and 5). This strap 40 constitutes an end abutment against which the end piece M' of the mold M is adapted to rest when the mold is placed on the supporting carriage 21.

The carriage 21 is provided with manually engageable means for moving the same in the form of a handle 42 secured at 43 to a front end of supporting element 35. This handle projects laterally away from the carriage so as to be readily accessible for engagement by the operator to move the carriage and the mold thereon toward and away from the stuffing horn 12.

In the use of the device the mold M is first placed on the transverse horizontal supporting elements 34—35 with its end M' against the end strap or abutment 40 and with its side remote from the operator against the vertical legs 37—38 of the supporting elements 34 and 35.

If the operator does not find that the mold is properly aligned with the head 13, the horizontal position of the carriage 21 can be adjusted by turning the legs 24—28 until the proper adjustment is secured.

Then the operator grips the handle 42 and moves the carriage 21 with its mold M thereon toward the stuffing horn 12, thereby bringing the head 13 on the stuffing horn 12 into telescoping relation with the mold. After the mold has been moved over the horn 12 to bring the head plate 19 adjacent the inside of the mold end piece M', the operator turns on the extruding mechanism to discharge meat or other material from the tube into the mold. This results in a gradual pushing of the mold off of the horn as it is charged with material. The operator, by applying pressure on the handle 42 in a direction toward the head 10, can resist the charging of the mold M with material so that the mold will be compactly and uniformly charged.

When the mold has been completely charged, the extruder is turned off and the mold is removed from the supporting carriage for replacement by an empty mold.

It will be understood that modifications and variations may be effected without departing from the scope of the novel concepts of the present invention.

I claim as my invention:

1. In a stuffing device for an elongated tubular mold having a closed end and an open end through which the mold is charged with material, a frame, a mold supporting carriage slidably mounted on the frame, a stuffing horn including a tube supported with a discharge end over said frame opposite the open end of the mold and a head comprising a plurality of spaced transverse plates on the tube discharge end, said plates having contours corresponding generally with that of the inside of the mold for telescoping and guiding the mold when the carriage is slid on said frame toward the stuffing horn, said carriage comprising a horizontal support, a side support, and an abutment at the end of the supports away from said horn for holding said mold in position for filling and means for moving said carriage to bring said mold into substantial telescoping relation with said horn and for holding the carriage to resist the pressure of the material as it is discharged from said horn into the mold between said closed mold end and said stuffing horn head, whereby the mold can be tightly charged with material.

2. In a stuffing device for an elongated tubular mold having a closed end and an open end through which the mold is charged with material, a frame, a mold supporting carriage slidably mounted on the frame, a stuffing horn including a tube supported with a discharge end over said frame opposite the open end of the mold and a head on the tube discharge end, said head comprising a pair of spaced transverse plates each having a contour corresponding generally with that of the inside of the mold for telescoping and guiding the mold when the carriage is slid on said frame toward the stuffing horn, said carriage comprising a horizontal support, a side support, and an abutment at the end of the supports away from said horn whereby said mold may be placed on said carriage from a lateral direction and held in axial alignment with said mold, and means for moving said carriage to bring said mold into substantial telescoping relation with said horn and for holding the carriage to resist the pressure of the material as it is discharged from said horn into the mold between said closed mold end and said stuffing horn head, whereby the mold can be tightly charged with material, said frame including adjustable legs each having a leveling device on its free extremity for adjustably engaging a surface to support the mold in leveled horizontal alignment with said horn.

3. In a stuffing device for an elongated tubular mold having a closed end and an open end through which the mold is charged with material, a frame, a mold supporting carriage slidably mounted on the frame and comprising a side, a bottom, and an end abutment whereby the mold may be inserted into the carriage from a lateral direction and maintained in alignment by said abutments, a stuffing horn including a tube supported with a discharge end over said frame opposite the open end of the mold and a head on the tube discharge end having a cross-sectional contour corresponding generally with and closely fitting the inside of the mold for telescoping and guiding the mold when the carriage is slid on said frame toward the stuffing horn, and means for moving said carriage to bring said mold into substantial telescoping relation with said horn and for holding the carriage to resist the pressure of the material as it is discharged from said horn into the mold between said closed mold end and said stuffing horn head, whereby the mold can be tightly charged with material, said head comprising a centrally apertured plate secured to the free end of the horn tube with its aperture aligned axially with the bore of the tube.

4. In a stuffing device for an elongated tubular mold having a closed end and an open end through which the mold is charged with material, a frame, a mold supporting carriage open at one side, at the top, and at one end slidably mounted on the frame, a stuffing horn including a tube supported with a discharge end over said frame opposite the open end of the mold and a head on the tube discharge end having a cross-sectional contour corresponding generally with and snugly fitting the inside of the mold for telescoping and guiding the mold when the carriage is slid on said frame toward the stuffing horn, and means for moving said carriage to bring said mold into substantial telescoping relation with said horn and for holding the carriage to resist the pressure of the material as it is discharged from said horn into the mold between said closed mold end and said stuffing horn head, whereby the mold can be tightly charged with material, said head comprising a centrally apertured plate secured to the free end of the horn tube with its aperture aligned axially with the bore of the tube, and a second similar plate spaced from the first-mentioned plate along the tube and secured thereto, said two plates guidingly supporting the mold on the tube as the mold is moved over and off of the tube.

FRANK H. HOY.

References Cited in the file of this patent

UNITED STATES PATENTS

| Number | Name | Date |
| --- | --- | --- |
| 225,028 | Straub | Mar. 2, 1880 |
| 723,072 | Thom | Mar. 17, 1903 |
| 2,113,081 | Doering | Apr. 5, 1938 |